(12) United States Patent
Thubert et al.

(10) Patent No.: US 10,091,102 B2
(45) Date of Patent: Oct. 2, 2018

(54) TUNNEL SUB-INTERFACE USING IP HEADER FIELD

(71) Applicant: Cisco Technology, Inc., San Jose, CA (US)

(72) Inventors: Pascal Thubert, Mougins (FR); Michael Behringer, Mougins (FR); Aswini Kumar Sattaluri, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 861 days.

(21) Appl. No.: 13/737,641

(22) Filed: Jan. 9, 2013

(65) Prior Publication Data

US 2014/0192808 A1 Jul. 10, 2014

(51) Int. Cl.
*H04L 12/741* (2013.01)
*H04L 12/715* (2013.01)
*H04L 12/721* (2013.01)
*H04L 29/06* (2006.01)
*H04L 12/46* (2006.01)

(52) U.S. Cl.
CPC .......... *H04L 45/74* (2013.01); *H04L 12/4633* (2013.01); *H04L 45/64* (2013.01); *H04L 45/68* (2013.01); *H04L 63/164* (2013.01)

(58) Field of Classification Search
CPC .......... H04L 45/74; H04L 45/64; H04L 45/68; H04L 12/4633; H04L 63/164
See application file for complete search history.

(56) References Cited

U.S. PATENT DOCUMENTS

| 7,451,305 | B1 | 11/2008 | Pritikin | |
|---|---|---|---|---|
| 8,095,788 | B2 | 1/2012 | Vilhuber et al. | |
| 2004/0006613 | A1* | 1/2004 | Lemieux | H04L 47/724 709/223 |
| 2004/0221051 | A1* | 11/2004 | Liong et al. | 709/230 |
| 2005/0071475 | A1* | 3/2005 | Bennett et al. | 709/227 |
| 2006/0092861 | A1* | 5/2006 | Corday et al. | 370/256 |
| 2009/0262741 | A1* | 10/2009 | Jungck et al. | 370/392 |
| 2010/0046531 | A1* | 2/2010 | Louati et al. | 370/401 |
| 2010/0135302 | A1* | 6/2010 | Ra et al. | 370/392 |
| 2010/0306352 | A1 | 12/2010 | Pritikin et al. | |
| 2012/0195197 | A1* | 8/2012 | Popa et al. | 370/235 |
| 2013/0163426 | A1* | 6/2013 | Beliveau | H04L 67/327 370/235 |
| 2013/0227670 | A1* | 8/2013 | Ahmad et al. | 726/11 |

OTHER PUBLICATIONS

"RPL: IPv6 Routing Protocol for Low power and Lossy Networks, draft-ietf-roll-rpl-19", Internet-Draft, T. Winter, Ed., IETF Trust, Mar. 13, 2011.*

(Continued)

*Primary Examiner* — Ian N Moore
*Assistant Examiner* — Ronald H Davis

(57) ABSTRACT

In one implementation, sub-interfaces are defined in Layer three (L3) tunnels, such as generic routing encapsulation (GRE) or Internet protocol security (IPsec) tunnels. Sub-interfaces inside a L3 tunnel may be preferred to using several L3 tunnels. The flow label of the tunnel header is used to define sub-interfaces of a tunnel interface. The flow label is populated with a routing instance identifier to index the sub-interfaces.

20 Claims, 3 Drawing Sheets

(56) References Cited

OTHER PUBLICATIONS

"Multiprotocol Label Switching Architecture", Request for Comments: 3031, E. Rosen, et al., The Internet Society, Jan. 2001.*
"IP in IP TUnneling", Request for Comments: 1853, W. Simpson, Oct. 1995.*
"IP Encapsulation within IP", Request for Comment: 2003, C. Perkins, The Internet Society, Oct. 1996.*
"IEEE 802.1X," webpage, Wikipedia, http://en.wikipedia.org/wiki/IEEE_802.1X, pp. 1-7, May 22, 2012.
"IEEE 802.1X-2004—Port Based Network Access Control," webpage, http://www.ieee802.org/1/pages/802.1x-2004.html, pp. 1-3, May 22, 2012.
"Secure Neighbor Discovery Protocol," webpage, Wikipedia, http://en.wikipedia.org/wiki/Secure_Neighbor_Discovery_Protocol, pp. 1-2, May 22, 2012.
"Neighbor Discovery for IP version 6 (IPv6)," webpage, http://tools.ietf.org/html/rfc4861, pp. 1-97, May 22, 2012.
"Cisco Discovery Protocol," webpage, Wikipedia, http://en.wikipedia.org/wiki/Cisco_Discovery_Protocol, p. 1, May 22, 2012.
"Link Layer Discovery Protocol," webpage, Wikipedia, http://en.wikipedia.org/wiki/Link_Layer_Discovery_Protocol, pp. 1-3, May 22, 2012.
"Routing Protocol Security Requirements (rpsec) (concluded WG)," webpage, http://datatracker,ietf.org/wg/rpsec/charter/, pp. 1-2, May 22, 2012.
"Neighbor Router Authentication: Overview Guidelines," webpages, Cisco IOS Security Configuration Guide, http://www.cisco.com/en/US/docs/ios/12_2/security/configuration/guide/scfroutr.html, pp. 1-5, May 22, 2012.
"The Public Key Infrastructure Approach to Security," Oracle9i Security Overview, Release 2 (9.2) Part No. A96582-01, © 2001-2002 Oracle Corporation, 8 pages; http://docs.oracle.com/cd/B10500_01/network.920/a96582/pki.htm.
Cisco Systems, Inc., "Unique Device Identifier Retrieval," © 2003-2006 Cisco Systems, Inc., 12 pages; http://www.cisco.com/en/US/docs/ios/12_3t/12_3t4/feature/guide/gtpepudi.html.
Cisco, Understanding Cisco TrustSec, Revised Jun. 16, 2011, 10 pages; http://www.risco.com/en/US/docs/switches/lan/trustsec/configuration/guide/arch_over.html.
Cooper, et al., "Internet X.509 Public Key Infrastructure Certificate and Certificate Revocation List (CRL) Profile," Network Working Group RFC 5280, May 2008, 166 pages; http://www.ietf.org/rfc/rfc5280.txt.
Interopnet Labs, "What is EAP-FAST?" InteropNet Labs Full Spectrum Security Initiative (May 2005), 1 page; http://www.opus1.com/nac/whitepapers-old/e-eapfast-lv05.pdf.
Use of the IPv6 Flow Label within an LLN draft-thubert-roll-flow-label-01, Abstract, http://tools.ietf.org/html/draft-thubert-roll-flow-label-01, pp. 1-8, Oct. 30, 2012.
Configuring Tag Switching, Layer 3 Switching Software Feature and Configuration Guide, 12.1(20)EB, Chapter 10, pp. 10-1-10-28, 2004.

* cited by examiner

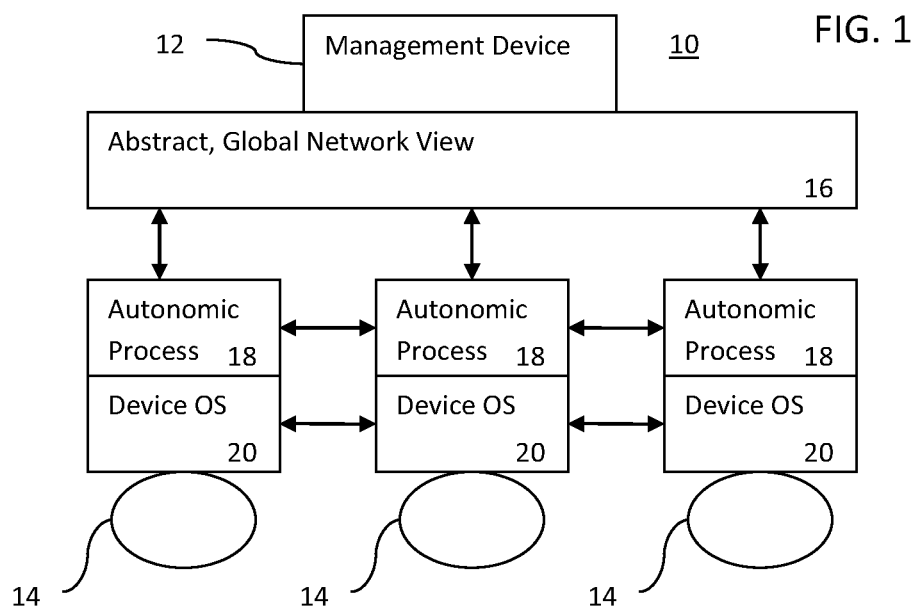
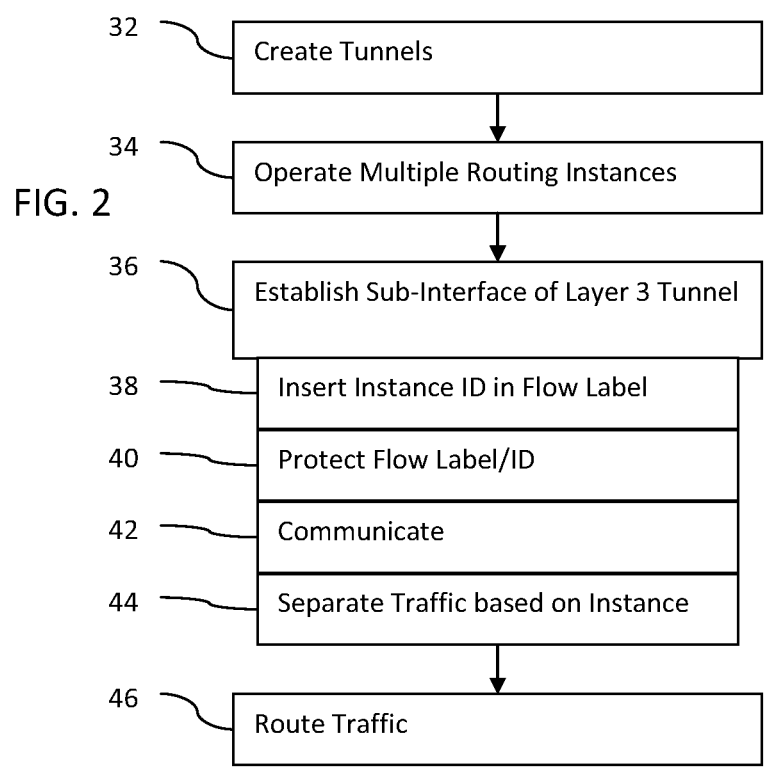

TUNNEL SUB-INTERFACE USING IP HEADER FIELD

TECHNICAL FIELD

This disclosure relates in general to the field of computer networks and, more particularly, to creating a tunnel sub-interface.

BACKGROUND

Tunnels in a computer network connect two or more network devices together. The tunnels are virtual cables. Network traffic from the same open systems interconnection (OSI) layer or lower is communicated over the tunnel. The network traffic, such as an Internet Protocol (IP) packet with or without transport information (e.g., Ethernet frame), is packaged in another IP packet for the tunnel. The IP packet for the tunnel includes tunnel information to route the nested network traffic to the tunnel destination for any further routing. Generally, a frame or packet enters a tunnel at one endpoint, "disappears" from the network, and "reappears" on the network at the other endpoint of the tunnel.

Some networks may use tunnels for virtual routing and forwarding (VRF). A routing protocol for the VRF may operate with multiple instances, such as for implementing routing that is dynamically created as network devices join or disconnect. Separate tunnels are established for the different instances. However, separate tunnels may increase processing, bandwidth, and/or memory requirements, especially where the tunnels are secured, such as with IPsec.

There are several methods to virtualize interfaces on layer two technologies, such as virtual local area network (VLAN) tags, asynchronous transfer mode virtual path/virtual circuit (ATM VP/VC), and frame relay virtual circuits. However, tunnels are created for layer three.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIG. 1 is a simplified block diagram of an example autonomic network for use of sub-interfaces in tunnels;

FIG. 2 is a flow chart diagram of one embodiment of a method for establishing sub-interfaces in layer three tunnels;

DESCRIPTION OF EXAMPLE EMBODIMENTS

Figure 3:
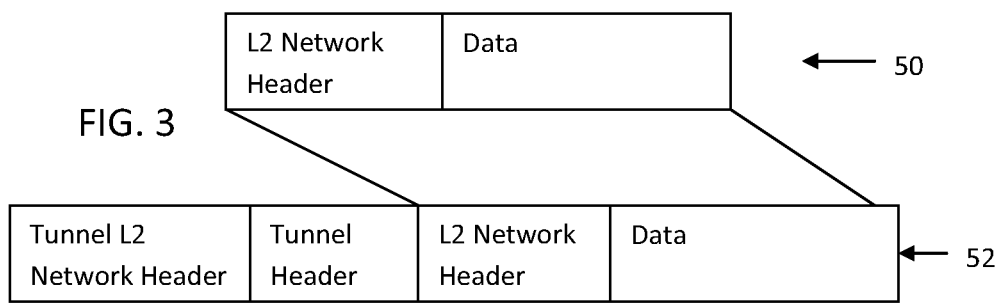
FIG. 3 illustrates an example tunnel header and payload.

For layer three tunnels, tunnels on sub-interfaces exist, but not sub-interfaces inside tunnels. Layer three (L3) tunnels, such as generic routing encapsulation (GRE) or Internet protocol security (IPsec) tunnels, do not allow for sub-interfaces. Sub-interfaces may be desired to avoid the overhead associated with creating parallel tunnels for different purposes. Sub-interfaces inside a L3 tunnel may be preferred to using several L3 tunnels.

The flow label of the tunnel header may be used to define sub-interfaces. Since tunnels may not otherwise use the flow label, the flow label may be used to define sub-interfaces of the tunnel interface. The flow label is populated with a routing instance identifier to index the sub-interfaces.

In one embodiment, sub-interfaces are defined for use in an autonomic network. FIG. 1 shows an example autonomic network 10 for creating a control plane for operations, administration, and management (OAM) and defining sub-interfaces of tunnels for the control plane. Autonomic networking relies on the components themselves, and greatly simplifies the interface to the operator and network management system. The intelligence used in the components provides the relevant best practices and keeps the network components up to date, without the need for human intervention.

Each network component self-manages in autonomic networks. Self-management includes, at least, self-configuration of a virtual network for OAM. An autonomic system may also include self-optimization, self-healing, and self-protection for each network component. Autonomic networking may bootstrap a general network in addition to the virtual network for OAM and/or may cover the entire life-cycle of the network 10.

Each network device 14 discovers the network 10 around itself and decides autonomically the appropriate behavior, such as the behavior for creating a control plane. As the network device learns new facts or receives input, the behavior may change. In one embodiment, the network devices 14 run their usual operating system 20 and still interact in the usual way on the operating system level, for example, performing routing protocols, spanning tree, or failover mechanisms run as in a traditional network. The autonomic process 18 runs on top of the normal operating system 20 using a northbound application programming interface (API) of the operating system 20. The autonomic process 18 may not define, for example, new routing protocols, but instead controls the way routing protocols are used. Essentially the autonomic process 18 configures the device 14 adaptively, changing due to the position in the network 10.

The autonomic process 18 determines what to configure and where. For example, the autonomic process 18 determines where to enable an interior routing protocol and/or on which interface to protect the network 10 against attacks. To adapt to the network 10 for configuring, the autonomic processes 18 communicate between various network devices 14. The domain identity (e.g., "router17.bank.com") along with a certificate is used to establish trust levels on all interfaces. For example, if a neighbor device 14 belongs to the same domain, the autonomic process 18 starts routing on that interface. Otherwise, the autonomic process 18 configures protective measures on that interface, so that this device 14 and the network 10 cannot be attacked. Network devices 14 with an autonomic process 18 and a verifiable domain identity are able to automatically form the network 10, bring up default addressing and routing, secure the network 10 against attacks from the outside, and/or enable services, such as multicast. This configuration may be achieved without any information from an operator or without a network management system configuring the device. The control or other plane may be created and protected automatically as well.

Autonomic networking is a fundamentally de-centralized approach. An autonomic device 14 has default behavior in the absence of central control. For example, in the absence of global IP address information, the autonomic process 18 picks appropriate private address ranges to allow the network 10 to at least work locally. The network 10 may rely on central resources represented as the network management system 12. Other centralize resources may include authentication, authorization, accounting (AAA) servers, a certification authority and/or domain name system servers.

The autonomic process 18 is separated into one or more protocols, which together form the autonomic behavior. The first protocol interaction an autonomic device 14 uses is adjacency discovery. Domain certificates are exchanged. In the absence of a domain identity, the first protocol enables bootstrapping. Each autonomic device 14 runs adjacency discovery on all interfaces, on layer two and/or on layer three, to be able to bridge potential non-autonomic layer two devices. The results are entered into a database, which lists for each interface the identity of the neighbor. This database is then used by higher level protocols, such as a protocol for establishing the control plane. In alternative embodiments, protocol separation is not used.

Higher layer autonomic processes 18 associate an interface with a certain trust level, based on this database. One such process is to create a control plane for OAM. Autonomic neighbors create an automatically generated control plane for the devices 14 in the autonomic network 10. The user does not configure the network 10 for creating the control plane. An out-of-band control plane may be used to configure and manage networking devices 14 without having to do any pre-configuration. A message bus allows for messaging related to the autonomic network between trusted devices. Towards untrusted devices, the message bus is inaccessible, which allows for separation of the autonomic control plane. The control plane is used to broadcast intent (e.g., abstracted or general directions) through the network 10, to correlate event information between various points of the network, and/or for configuring the network devices 14.

The autonomic network 10 may rely on a mesh of tunnels in the control plane for OAM. Multiple routing instances in a single virtual routing and forwarding (VRF) are used for the control plane rather than separate VRF and tunnel infrastructure for each instance. The VRF for the control plane is attached to the tunnel interfaces. As the autonomic network evolves, the routing topology may change. Due to resource constraints, it is not desirable to create more than one parallel tunnel, especially for secured tunnels. Sub-interfaces using the same tunnel may be used to automatically separate traffic for those instances. The flow label may be used to create the sub-interfaces in the layer three tunnels. Several routing instances are run in a single overlay network of tunnels using the flow label to define sub-interfaces for the different routing instances.

Other planes or virtual networks may use the flow label to distinguish between different routing instances for using a same tunnel system. In yet other embodiments, a network without autonomic creation uses sub-interfaces in layer three tunnels. For example, a network for industrial monitoring uses the same tunnels for different types of information. Security, lighting monitor, equipment operation, and/or other information are routed over the same network of tunnels, but for different instances of the routing topology. The instances may be separated by placement in the flow label of the tunnel headers, creating sub-interfaces without requiring separate tunnels.

A given network device 14 may participate in multiple planes, such as controlling the ingress for both control plane and data plane traffic. The flow label (e.g., a differentiated security code point (DSCP) value) may be used for control plane and/or data plane traffic. Since the tunnel ingress router controls both data plane and control plane traffic, the flow label may be used in the same or different ways for each of the types of traffic. For example, the flow label may index routing instances for control plane traffic, but be used to label the flow for non-tunnel data plane traffic. Using the flow label for layer three tunnels allows this separation.

FIG. 2 shows a method for defining sub-interfaces in tunnels. A lightweight approach defines sub-interfaces in a given layer three tunnel using the flow label or differentiated services field. In one example, several routing instances are run inside a single IPsec tunnel, each instance being indexed for the tunnel with the instance identifier.

Figure 5:
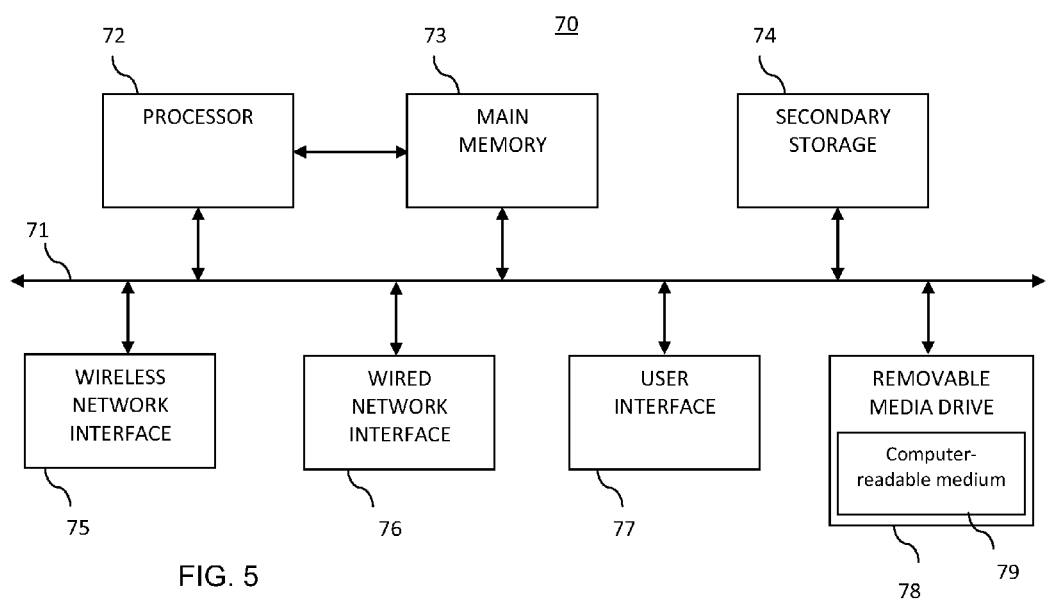
FIG. 5 is a block diagram of an embodiment of an apparatus for establishing sub-interfaces in layer three tunnels.

The method is implemented by the network devices 14 of FIG. 1, the management system 12, the network device 70 of FIG. 5, or other devices. For example, the processor 72 performs or participates in acts 32-46. Acts 38, 40, and 42 involve a tunnel ingress device, while act 44 is for the tunnel egress device. A given device may be just an ingress, just an egress, or both an ingress and egress device.

Additional, different, or fewer acts may be provided. For example, act 32 is not provided, so already existing tunnels are used. As another example, act 40 is not provided. In another example, sub-interfaces are created for other purposes than the multiple routing instances in act 34. The acts are performed in the order shown or a different order.

In act 32, one or more tunnels are created between devices in a network. For example, a control plane of an autonomic network is started by creating tunnels between the network devices 14 in the network 10. Neighboring autonomic network devices 14 automatically establish virtual point-to-point connections between each other. Using neighbor discovery and validation, the autonomic control plane may be built between neighbor devices 14 of the same domain with current or validated domain credentials. In other embodiments, the tunnels are configured or created based on user input.

Any tunnel creation may be used. The tunnel is a virtual, Internet protocol (IP) tunnel, so shares cabling used for other purposes as well. Alternatively, the tunnel uses separate cabling and/or other hardware. In one embodiment, IPv6 local links are used as tunnel endpoints between devices that are directly adjacent over a link. Network connectivity across routes in the control plane is created by using a default and/or unchangeable IPv6 routing setup.

The tunnels are virtual point-to-point tunnels defined at layer three (L3) of the TCP/IP stack. The tunnels extend over one or more hops, so may be direct between neighbor devices or indirect between devices separated by one or more other nodes of the network. This versatility in defining the tunnel end points is provided by defining the tunnel in the network layer, L3.

The tunnels are secure tunnels. IPsec and generic routing encapsulation (GRE) are two example types of secure tunnels. As another example, a VLAN/MACsec based connection is used. The trust information is created and used for Trustsec operations. If the neighbor devices 14 have valid credentials, 802.1AE or the Institute of Electronics and Electrical Engineers (IEEE) MACsec is enabled on the link between those two network devices 14. Other types of secure tunnels may be used. In alternative embodiments, the tunnels are not secured.

Any type of security may be provided. For example, encryption is used. The virtual, point-to-point (p2p) connections are created with encryption. The payload of tunnel packets are encrypted by the ingress device of the tunnel and decrypted by the egress device of the tunnel. Other types of security include integrity checks.

The tunnels are used for the control plane or other network. The tunnels terminate in the control plane or other network. Virtual routing and forwarding (VRF) implement the control plane or other network, so the tunnels are defined for the VRF.

In act 34, multiple routing instances are operated for the network. The traffic of the network, such as the virtual control plane, is routed. For example, a given virtual routing and forwarding (VRF) is used to establish the control plane. The secured tunnels are placed within this separate, virtual network. The secured tunnels terminate in the VRF. A common VRF is provided for the control plane.

Any routing may be used for the VRF. For example, routing for low power and lossy networks (RPL) is used for the control plane. Other types of routing may be used for the control plane, such as open shortest path first (OSPF). The data plane or other planes use the same or different types of routing in a separate VRF.

Multiple instances of the routing in the VRF are used. The different instances account for different topology and corresponding constraints. For example, different routing instances of RPL are provided for optimizing for bandwidth, speed, jitter, or other constraint. Different instances provide different optimization of the constraints. Alternatively or additionally, different instances may occur due to evolution of the network 10 over time. Different network devices 14 join or are removed from the network 10. As these changes occur, another instance of the routing for the common VRF may be provided rather than reconfiguring existing instances.

The routing protocol, such as RPL, may use tagging of an identification of the instance for any traffic. The identification indicates the topology. For example, RPL requires an option in the IPv6 hop-by-hop header for tagging the instance identification.

The different instances of the routing in the common VRF use the same tunnels. To share the same tunnel, sub-interfaces are assigned in the tunnel interface in act 36. The sub-interfaces are assigned at layer three with the flow label or differentiated services field (e.g., DSCP). For example, the IPv6 flow label or DSCP field is used to tag sub-interfaces on a tunnel interface and apply that tag to RPL instances in the autonomic network. The sub-interfaces are associated with instances of the routing protocol, such as a separate sub-interface for each instance.

The virtual routing and forwarding is indexed with the interface for the IP tunnel and the flow label or differentiated services field. The interface for the IP tunnel identifies the tunnel. The flow label identifies the sub-interface of the IP tunnel. The sub-interfaces correspond to the instances. The RPL option (e.g., field in the IPv6 hop-by-hop header) is eliminated, replaced, or changed. Instead, the instance identification is tagged in the flow label or DSCP field of the tunnel. A single tunnel is used, but the VRF associated with the tunnel is indexed with both the tunnel interface and the flow label, allowing a lightweight implementation of sub-interfaces inside the tunnel without requiring a separate or inside tunnel.

In one embodiment, the sub-interface is assigned by an autonomic router for a control plane in an autonomic network. The network device 14 at the ingress of the tunnel assigns the sub-interface to traffic by populating the flow label with the routing instance identification. Other devices 14 may assign the sub-interface. Other types of networks may use sub-interfaces of the L3 tunnel.

Acts 38-44 provide one example of establishing the sub-interfaces of the L3 tunnel. Sub-interfaces are established without creating separate tunnels, such as separate parallel tunnels. A parallel tunnel has the same endpoints as another tunnel. In other embodiments, separate tunnels are created for some purposes, but sub-interfaces are established in one or more of the tunnels.

Additional, different, or fewer acts may be provided. For example, act 42 associated with transmitting traffic and act 44 associated with tunnel egress performance may not be provided for establishing the sub-interface. As another example, act 40 is not performed. In yet another example, acts for creating the tunnel interface are included.

The acts 38-44 are performed in the order shown or a different order. For example, act 40 is performed, in part, after the communication of act 42.

In act 38, a routing instance identifier is inserted into flow label field of the tunnel. The insertion is performed multiple times for the same tunnel for different packets of data traffic. The insertion is performed for different tunnels for the same data traffic and/or different data traffic. The data traffic includes source and destination information. The tunnel may be the only route (e.g., ingress router generates the data traffic) or may be only part of the route for the data traffic to progress from the source to the destination (e.g., data traffic created by another device is received by the ingress router).

As data traffic is prepared to be transmitted through the tunnel, the routing instance identified for the data traffic is determined, such as extracting the instance identifier from the header for the data traffic. FIG. 3 shows example data traffic 50 with a network header and corresponding data payload. The network header is from the original protocol data unit (PDU) that is to be encapsulated in the tunnel. For the tunnel, the original network header may not be examined by the network devices 14 since the original network header is made part of the tunnel's payload.

Using just the tunnel interface, the tunnel network header and tunnel header are added to provide the tunnel traffic 52. The network header and data of the data traffic are the payload of the tunnel traffic. The tunnel network header carries the source and destination addresses of the tunnel end points. For example, the tunnel network header is a L3 IP header. The tunnel header is specific to the tunneling protocol, such as a GRE, IPSec, L2TP or PPTP header. Tunnel endpoints may have multiple tunnels between them and, among other things, the tunnel headers allow the end points to identify traffic from one tunnel or another.

The tunnel header may include a flow label field. This flow label field may or may not be used by the tunnel interface without sub-interfaces. For example, a randomized number is inserted into the flow label field for the tunnel. For defining sub-interfaces, at least a part of the flow label field is used.

Figure 4:
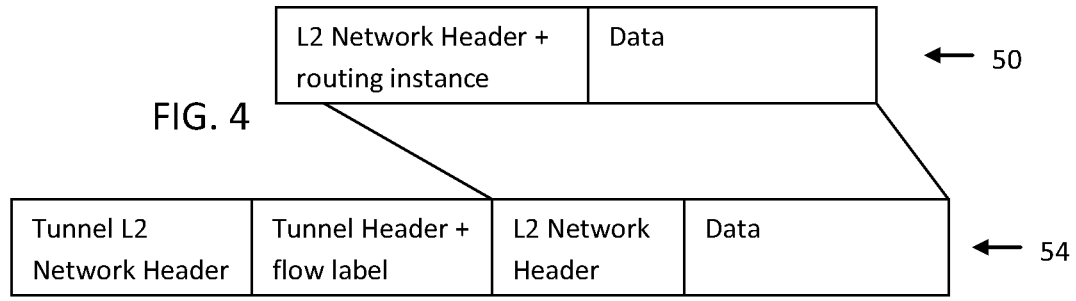
FIG. 4 illustrates an example tunnel header and payload where a flow label is used for identifying instances of a routing protocol.

FIG. 4 shows that the network header of the data traffic includes an indication of the routing instance. Other sources of the routing instance may be provided, such as identifying the routing instance based on the source, destination, and/or payload. Since sub-interfaces are to be defined, the routing instance is extracted from the network header of the data traffic or other source.

The identification of the routing instance is inserted into the flow label field of the tunnel header, as shown by the tunnel traffic 54. For example, the RPL instance identifier is inserted. IPv6 allows the source of a packet to set the flow label. For a tunnel interface, the autonomic router is thus entitled to set the flow label. To create the sub-interface with an index to the routing instance, the flow label field is populated with the routing instance, such as the RPL instance identification. The bit sequence of the flow label field is forced to a given value depending on the session.

The flow label field is defined by IPv6. For other versions, such as IPv4, the differentiated services code point (DSCP) field may be used. To the extent IPv6 supports DSCP, the DSCP field may be used as the flow label for IPv6 implementation.

As shown in FIG. 4, the identifier of the routing instance is inserted into the tunnel header. In other embodiments, the identifier is inserted into the tunnel network header or both the network header and the tunnel network header. The identifier is inserted into the header defining the tunnel rather than the encapsulated data traffic to be transported in the tunnel. Alternatively, the insert is into the network header of the data traffic.

Other routing information may be included in the flow label. For example, the flow label may be used as a replacement to the RPL option. The network device 14 implements rules for the root to set and reset the flow label when forwarding between the inside of the RPL domain and the larger Internet, in both directions. An IPv6 may be saved in an IPv6 encapsulation within the RPL domain that is required with the RPL option for all packets that reach outside of the RPL domain. Only a portion of the flow label (e.g., instance ID) may be used to indicate the subinterface.

All the packets that are leaving a destination oriented directed acyclic graph of the RPL domain towards the Internet transit via a same root. The IPv6 flow label is set in the root to a same value across multiple sources of a same flow when that operation is needed, ensuring compliance with the rules defined by the IPv6 flow label specification within the Internet. At the same time, the root segregates the Internet and the RPL domain, allowing reuse of the flow label within the RPL domain.

The flow label may be reused within the RPL domain as a replacement to the RPL option. The use of the flow label within a RPL domain is an instance of the stateful scenarios where the states include the rank of a node and the RPL instance identification. Instance identification and/or loop avoidance and detection are defined in packet fields. Those fields include an '0', and 'R' and an 'F' bits, the 8-bit RPL instance identification, and the 16-bit SenderRank. SenderRank is the result of the DAG Rank operation on the rank of the sender, where the DAG Rank operation is defined as: DAGRank(rank)=floor(rank/MinHopRankIncrease). If MinHopRankIncrease is set to a multiple of 256, the most significant 8 bits of the SenderRank will be all zeroes and may be omitted. In that case, the flow label may be used as a replacement to the RPL option.

The SenderRank is expressed with 8 least significant bits, and the information carried within the flow label in a packet is constructed as follows: 0|O|R|F|SenderRank|RPL instance ID|. The first (leftmost) bit of the flow label is reserved and should be set to zero.

For root operation, the semantics are assigned to various bits in the flow label, destroying within the edge network that is the RPL domain a property of belonging to a statistically uniform distribution desirable in the rest of the Internet. This property is restored by the root for outgoing packets. Depending on the policy in place, the source of a packet decides whether to use the flow label to transport the RPL information in the IPv6 packets. If the flow label is to be used, the source in the LLN sets the flow label to zero and the flow label is treated as a value that may change end-to-end.

Other uses or changes for inserting the routing instance identification into the flow label may be used. Other or no additional routing information may be inserted into the flow label. While an RPL specific example is given above, the same, similar, or other changes may be made for inserting information associated with other routing.

In act 40, the sub-interface definition is protected against modifications during transmission between the end points of the tunnel. The flow label or differentiated services field is protected. The protection prevents and/or makes changes detectable. In one embodiment, the flow label is incorporated into the packet signature. The tunnel header or the flow label field of the header is included in message integrity checks (MIC). Any type of integrity check may be used. For any tunnel which may have sub-interfaces defined by the routing instance in the flow label, the flow label field is part of the signature or integrity check. The ingress node for the tunnel determines the signature, parity, or other integrity information.

Any alteration of the instance identification in the flow label may be detected. The egress node performs the integrity check, such as checking the parity or signature. If the inner packet is for the same instance, then the same flow label may be provided in the inner and outter headers. The outer flow label is then compared with the inner that is protected by IPSEC.

In an alternative or additional embodiment, the flow label or differentiated services field of the tunnel header is swapped with the flow label or differentiated services field of the data traffic. The original flow label may not refer to the instance and cannot be copied in the outter (tunnel) header. The instance is hidden in the inner packet by swapping, thus exposing the packet's original flow label in the tunnel header. The routing instance, in the flow label for the tunnel, is now part of the header for the data traffic, so is encapsulated in the tunnel. Where the tunnel is secure (e.g., IPsec), the encapsulated information is protected against change during transit. For example, the encapsulated information is encrypted.

Upon receipt, the endpoint of the tunnel reverses the swap after unencrypting. The routing instance identification is placed back into the tunnel header by swapping the flow label fields. At the tunnel end point, the original flow label is recovered by reswapping before the subinterface is determined, and thus extract the full original packet from the subinterface.

In act 42, the packets of the data traffic are communicated. The ingress endpoint of the tunnel encapsulates the data traffic in the tunnel headers. Based on the tunnel header information, the tunnel traffic is transmitted directly or indirectly to the endpoint of the tunnel. For secure tunnels, the encapsulated information is encrypted for transmission. On receipt, the encapsulated information may be decrypted.

In act 44, the receiving endpoint of the tunnel may remove the tunnel header information and process the data traffic according to the network header of the data traffic.

The received packets of the data traffic are separated. The separation is based on the sub-interface. The routing instance identifiers are extracted from the flow label fields of the tunnel headers. The identifiers from the flow label field are used to separate according to the routing instance.

In act 46, the routing instance identification from the tunnel header may be used to perform further routing according to the sub-interface or routing instance. The subinterface points on a different VRF, that is a different routing table. The IPSEC crypto is shared between subinterfaces on the same tunnel, but once crypto is passed, the routing tables will be different. The separated packets are routed according to the respective routing instances from the flow label fields. The data traffic may be transmitted to other destinations or processed where the endpoint of the tunnel is the destination of the data traffic. The tunnel headers are removed for further processing according to the routing instance.

Referring to FIG. 1, the network 10 includes two or more network devices 14. In one embodiment, the network 10 includes tens, hundreds, thousands or more of the network devices 14. "Network device" is meant to encompass any computing device or network element such as servers, routers, personal computers, laptops, smart phones (e.g., cell phones with computing capabilities), personal digital assistants, client computers, network appliances, switches, bridges, gateways, processors, load balancers, wireless LAN controllers, firewalls, management station, or any other suitable device, component, element, or object operable to affect or process electronic information in a network environment.

The network 10 may be for a single domain (e.g., cisco.com) or multiple domains (e.g., cisco.com and pepsi.com). For example, the network may be a wide area network, local area network, intranet, extranet, wireless local area network, virtual local area network, or combinations of networks for one or more companies. Any form of network may be provided, such as transport networks, enterprise, data center, or other wired or wireless network. The network 10 may be applicable across platforms, extensible, and/or adaptive to specific platform and/or technology requirements through link-negotiation of connectivity.

The network 10 may be relatively static, such as the same network devices 14 being provided over minutes, days, weeks, or years. Network devices 14 may be occasionally added or replaced. In other embodiments, the network 10 is dynamic, such as allowing network devices 14 to be added or removed frequently. For example, personal computers or smart phones may connect or disconnect from the network 10 throughout a day.

The network devices 14 are connected over links through ports. Any number of ports and links may be used. The ports and links may use the same or different media for communications. Wireless, wired, Ethernet, digital subscriber lines (DSL), telephone lines, T1 lines, T3 lines, satellite, fiber optics, cable and/or other links may be used. Corresponding interfaces are provided as the ports.

For communicating with each other, the network devices 14 perform neighbor discovery. Neighbors include direct neighbors, such as network devices 14 connected together by one hop or a single link. Neighbors may include indirect neighbors, such as network devices 14 connected together by more than one hop or over multiple links with one or more intervening network devices 14. The neighbors may be neighbors either on layer two (link layer) or on layer three (network layer).

The neighbor discovery is performed by each of the network devices 14. Each device transmits neighbor discovery packets. For example, each network device 14 broadcasts neighbor discovery packets periodically. The network devices 14, receiving the packets, may perform neighbor discovery for themselves. Each network device 14 determines its own neighbors from the packets transmitted from the neighbors.

The network devices 14 form the control plane with the discovered neighbors. The control plane is formed from tunnels. The control plane allows for OAM functions from an administrator for the network 10. To ease administration of the network, the control plane is maintained despite configuration by the administrator. The administrator is prevented from making any changes to the automatically created control plane. Alternatively, the control plane is configured by the administrator. In other embodiments, other virtual networks or planes are defined.

The management device 12 may be the same or different type of device than one or more of the network devices 14. In an autonomic network, the management device 12 is made a part of the network 10 and control plane automatically. Alternatively, the user designates one or more network devices 14 to be the management device 12 as part of user configuration. In other embodiments, a separate management device 12 may not be specifically provided. Instead, the management device 12 is any of the devices 14 with which a user gains access for configuring.

The network management system 12 may be used to alter the pre-defined default behavior. Such dependencies are minimized where possible and not needed to create and operate the network. If the central resource is not available, the autonomic device 14 has a fallback behavior defined that explains how to react in a constructive way.

The management device 12 uses the control plane to communicate OAM information. In one embodiment, the configuration or control information may be abstracted. Rather than specifically configuring a given network device 14, the management device 12 transmits a statement of intent or value of general operation of the network. For example, the intent is to provide "maximum security." The network devices 14 interpret the intent and make specific changes or set the configuration accordingly. For example, the network devices 14 interpret the statement of maximum security to use IPsec for communications. Where IPsec is not supported, that node may not be used. In other embodiments, specific configuration or other OAM information is communicated over the control plane.

FIG. 5 is a simplified block diagram of an example network device 14, such as a general or special purpose computer. The example network apparatus or device 70 corresponds to network elements or computing devices that may be deployed in the network 10. The network device 70 includes software and/or hardware to perform any one or more of the activities or operations for indexing sub-interfaces in network layer tunnels using the routing instance identification in the flow label of the tunnel.

The network device 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of network device 70.

Additional, different, or fewer components may be provided. The components are intended for illustrative purposes and are not meant to imply architectural limitations of network devices 14. For example, the network device 70 may include another processor and/or not include the secondary storage 74 or removable media drive 78. Each network device 14 may include more or less components than other network devices 14.

The processor 72, which may also be referred to as a central processing unit (CPU), is any general or special-purpose processor capable of executing machine readable instructions and performing operations on data as instructed by the machine readable instructions. The main memory 73 may be directly accessible to processor 72 for accessing machine instructions and may be in the form of random access memory (RAM) or any type of dynamic storage (e.g., dynamic random access memory (DRAM)). The secondary storage 74 may be any non-volatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The wireless and wired network interfaces 75 and 76 may be provided to enable electronic communication between the network device 70 and other network devices 14 via one or more networks. In one example, the wireless network interface 75 includes a wireless network controller (WNIC) with suitable transmitting and receiving components, such as transceivers, for wirelessly communicating within the network 10. The wired network interface 76 may enable the network device 70 to physically connect to the network 10 by a wire, such as an Ethernet cable. Both wireless and wired network interfaces 75 and 76 may be configured to facilitate communications using suitable communication protocols, such as the Internet Protocol Suite (TCP/IP).

The network device 70 is shown with both wireless and wired network interfaces 75 and 76 for illustrative purposes only. While one or both wireless and hardwire interfaces may be provided in the network device 70, or externally connected to network device 70, only one connection option is needed to enable connection of network device 70 to the network 10. The network device 70 may include any number of ports using any type of connection option.

A user interface 77 may be provided in none, some or all machines to allow a user to interact with the network device 70. The user interface 77 includes a display device (e.g., plasma display panel (PDP), a liquid crystal display (LCD), or a cathode ray tube (CRT)). In addition, any appropriate input device may also be included, such as a keyboard, a touch screen, a mouse, a trackball, microphone (e.g., input for voice recognition), buttons, and/or touch pad.

Instructions embodying the activities or functions described herein may be stored on one or more external computer-readable media 79, in main memory 73, in the secondary storage 74, or in the cache memory of processor 72 of the network device 70. These memory elements of network device 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by network device 70 that cause the machine to perform any one or more of the activities disclosed herein.

The instructions stored on the memory as logic may be executed by the processor 72. The functions, acts, or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

Additional hardware may be coupled to the processor 72 of the network device 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The network device 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in network device 70 to appropriately manage the operation of the hardware components therein.

One or more of the memories 73, 74, 79, or another memory stores the data traffic. The data traffic is created by the processor 72 or received by the network device 70 from another component of the network. The data traffic includes source and destination identification. The network device 70 is along the route from the source to the destination. A tunnel and associated tunnel interface exists along all or a part of the route. The tunnel is to be used to communicate the data traffic along the route. The data traffic is for a control plane or other plane of an autonomic network. Alternatively, the data traffic is for another type of network, such as an industrial processing or control network.

The data traffic may include an identifier for a routing protocol instance to be used on a virtual network. The routing protocol instance is for virtual routing and forwarding (VRF), such as being for a virtual network. Other data traffic is for the same VRF and corresponding virtual network. The various data traffic is for the same or different instances of the VRF. For example, the memory stores header information that includes the instance identification for a routing protocol for low power and lossy networks (RPL). Different data traffic has the same or different instance identification.

The memory also stores a tunnel header for the tunnel interface. For example, a tunnel is defined for the VRF. Any tunnel may be used, such as an IPsec or GRE tunnel. The tunnel header includes various fields for defining the tunnel. To use the tunnel, the tunnel header is added to the data traffic. The encapsulated data traffic may then be transmitted between the endpoints of the tunnel without processing the encapsulated data traffic information. Accordingly, the encapsulated data traffic may be encrypted.

The processor 72 is configured to create sub-interfaces for the tunnel interface using the routing instance identifier. Rather than having separate tunnels for different instances of the routing protocol, sub-interfaces are defined for the tunnel interface. The sub-interfaces are tagged or indexed with the routing instance identifiers. Different sub-interfaces are provided for different instances.

The sub-interface is indexed by the processor 72 placing the instance identifier in the flow label or differentiated services field of the tunnel header. The entire field or part of the field is used, such as using the least or most significant two, three, four, or more bits. In one example, the identifier is positioned in the flow label of a IPv6 defined header. The instance identifier for the data traffic is added to the tunnel header in the flow label field. The instance identifier is copied from the data traffic network header to the tunnel header.

The processor 72 may add protection. For example, the processor 72 includes the flow label, as populated with the instance identifier, in a packet signature or value calculated for message integrity. As another example, the processor 72 swaps the flow label of the tunnel header with the flow label of the data traffic payload so that the sub-interface indexing is encapsulated, and thus encrypted. The crypto happens first and is independent of the subinterface level.

The processor 72 creates the tunnel packet. The tunnel header, populated with the routing instance identifier in the flow label, is added to the data traffic. Once created, the processor 72 transmits the tunnel packet to the other endpoint of the tunnel.

Where the processor 72 is at the receiving endpoint, the processor 72 determines the sub-interface for the tunnel packet. The instance identifier is extracted from the flow label field. Where protected by swapping, the processor 72 unencrypts the payload and reverses the swap. Alternatively, the processor 72 extracts the identifier from the flow label of the data traffic. Once extracted, the flow label information from the tunnel header is added back to the data traffic. The data traffic is restored.

The receiving processor 72 then routes the data traffic according to the instance identified by the sub-interface and according to the destination of the data traffic. Where the processor 72 is part of the network device 70 that is the destination, the payload of the data traffic is extracted and processed. Where the processor 72 is not part of the destination, the data traffic is routed according to the routing instance to another device. The routing may or may not use another tunnel. The processor 72 may define a sub-interface for routing the data traffic to another tunnel.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
   creating layer three tunnels between devices in a network, wherein each layer three tunnel has a tunnel header;
   operating multiple routing instances for the network;
   inserting identifiers of the routing instances for packets of data traffic into flow label fields of the tunnel headers, different identifiers for each of the created tunnels representing parallel virtual point-to-point routes between the same devices;
   communicating the packets of the data traffic between the devices using the created tunnels based on the tunnel headers of the packets of the data traffic;
   separating the packets of the data traffic based on the identifiers of the routing instances from the flow label fields of the tunnel headers; and
   routing the separated packets according to the respective routing instances from the flow label fields of the tunnel headers,
   wherein operating the multiple routing instances for the network comprises operating multiple routing instances of a routing protocol for low power and lossy networks (RPL), and wherein inserting comprises inserting RPL instance identifiers.

2. The method of claim 1 wherein creating the tunnels comprises creating secure tunnels.

3. The method of claim 1 wherein creating the tunnels comprises creating the tunnels as IPsec tunnels.

4. The method of claim 1 wherein operating the multiple routing instances comprises operating a control plane with different ones of the instances corresponding to network evolution over time in an autonomic network.

5. The method of claim 1 wherein operating the multiple routing instances comprises operating the multiple routing instances pursuant to a common virtual routing and forwarding.

6. The method of claim 1 wherein inserting the identifiers comprises inserting the identifiers of the routing instances into differentiated services code point fields of the tunnel headers.

7. The method of claim 1 wherein inserting the identifiers comprises inserting the identifiers into an unused field in the tunnel header.

8. The method of claim 1 wherein separating comprises extracting the identifiers from the flow label fields of tunnel headers, and wherein routing comprises removing the tunnel headers and transmitting the packets based on destinations in the packets.

9. The method of claim 1 further comprising including the flow label fields in message integrity checks.

10. The method of claim 1, further comprising swapping a flow label field of the packets with the flow label fields of the tunnel headers for the communicating, wherein the communicating comprises encrypting the packets.

11. The method of claim 1 wherein the different identifiers for each created tunnel are for different types of information.

12. A system comprising:
   a plurality of devices in a network, each device configured to:
      create layer three tunnels between devices in a network, wherein each layer three tunnel has a tunnel header; and
      operate multiple routing instances for the network by operating multiple routing instances of a routing protocol for low power and lossy networks (RPL);
   an ingress device among the plurality of devices configured to:
      insert identifiers of the routing instances for packets of data traffic into flow label fields of the tunnel headers, different identifiers for each of the created tunnels representing parallel virtual point-to-point routes between the same devices, wherein inserting comprises inserting RPL instance identifiers; and
      communicate the packets of the data traffic between the devices using the created tunnels based on the tunnel headers of the packets of the data traffic; and an
   egress device among the plurality of devices configured to:
      separate the packets of the data traffic based on the identifiers of the routing instances from the flow label fields of the tunnel headers; and
      route the separated packets according to the respective routing instances from the flow label fields of the tunnel headers.

13. The system of claim 12, wherein each device in the network is configured to create the tunnels by creating secure tunnels.

14. The system of claim 12, wherein at least some of the devices in the network are configured to create the tunnels by creating the tunnels as IPsec tunnels.

15. The system of claim 12, wherein each device in the network is configured to operate the multiple routing instances by operating a control plane with different ones of the instances corresponding to network evolution over time in an autonomic network.

16. The system of claim 12, wherein each device in the network is configured to operate the multiple routing instances by operating the multiple routing instances pursuant to a common virtual routing and forwarding.

17. The system of claim 12, wherein the ingress device is configured to insert the identifiers by inserting the identifiers of the routing instances into differentiated services code point fields of the tunnel headers.

18. The system of claim 12, wherein the egress device is configured to:
   separate the packets of data traffic by extracting the identifiers from the flow label fields of tunnel headers; and
   route the separated packets by removing the tunnel headers and transmitting the packets based on destinations in the packets.

19. The system of claim 12, wherein the ingress device is further configured to include the flow label fields in message integrity checks.

20. The system of claim 12, wherein the ingress device is further configured to:
   swap a flow label field of the packets with the flow label fields of the tunnel headers to communicate the packets by encrypting the packets.

* * * * *